June 15, 1937.    W. FOUQUET    2,083,701
PROTECTIVE SYSTEM FOR RECTIFIERS
Filed Oct. 9, 1936    2 Sheets-Sheet 2

WITNESSES:
C. J. Weller
S. A. Strickler

INVENTOR
Walter Fouquet.
BY O. B. Buchanan
ATTORNEY

Patented June 15, 1937

2,083,701

UNITED STATES PATENT OFFICE 2,083,701

PROTECTIVE SYSTEM FOR RECTIFIERS

Walter Fouquet, Berlin-Siemensstadt, Germany, assignor to Siemens-Schuckertwerke Aktiengesellschaft, Berlin-Siemensstadt, Germany, a corporation of Germany Application October 9, 1936, Serial No. 104,844
In Germany September 30, 1935

11 Claims. (Cl. 175—363)

In the control of rectifiers, synchronously rotating contact apparatus is to a large extent utilized for the production of the control potential impulses. An indispensible condition of the satisfactory operation of such control is that the synchronous position of the contact apparatus is not changed, i. e., that the contact apparatus shall continually run at synchronous rotational speed. A deviation of the contact apparatus rotational speed from synchronous will effect a false release of the rectifier through which overcurrents and, for example in inverter operation, also backfire may result which, in turn, results in an endangering of the whole plant.

It is an object of my invention to provide a safety device for rectifiers controlled by synchronously running contact apparatus through which disturbances arising from deviation of the contact apparatus rotational speed from synchonous speed are suppressed.

According to my invention, it is proposed to provide a supervisory device which operates on the occurrence of a deviation of the contact apparatus rotational speed from synchronism. The operation of the supervisory device is preferably utilized to disconnect the rectifier plant, particularly by blocking the discharge vessels.

For supervising the rotational speed of the contact apparatus, the comparison of this rotational speed with a magnitude corresponding to the synchronous rotational speed at which the contact apparatus is to run is preferably utilized. This magnitude may moreover be a rotational speed which is synchronous with the rotational speed of the contact apparatus during disturbance free operation. The comparison may, for example, be so carried out that the angular position of the contact apparatus is compared with the angular position of a synchronously running comparison motor, or by purely electrical means by coupling to the contact apparatus a small synchronous generator, the frequency of which is compared with a comparison frequency which is in constant relationship to the frequency of the synchronous generator during disturbance free operation.

Other objects and advantages will be apparent from the following disclosure taken in conjunction with the accompanying drawings, in which.

Figure 1:
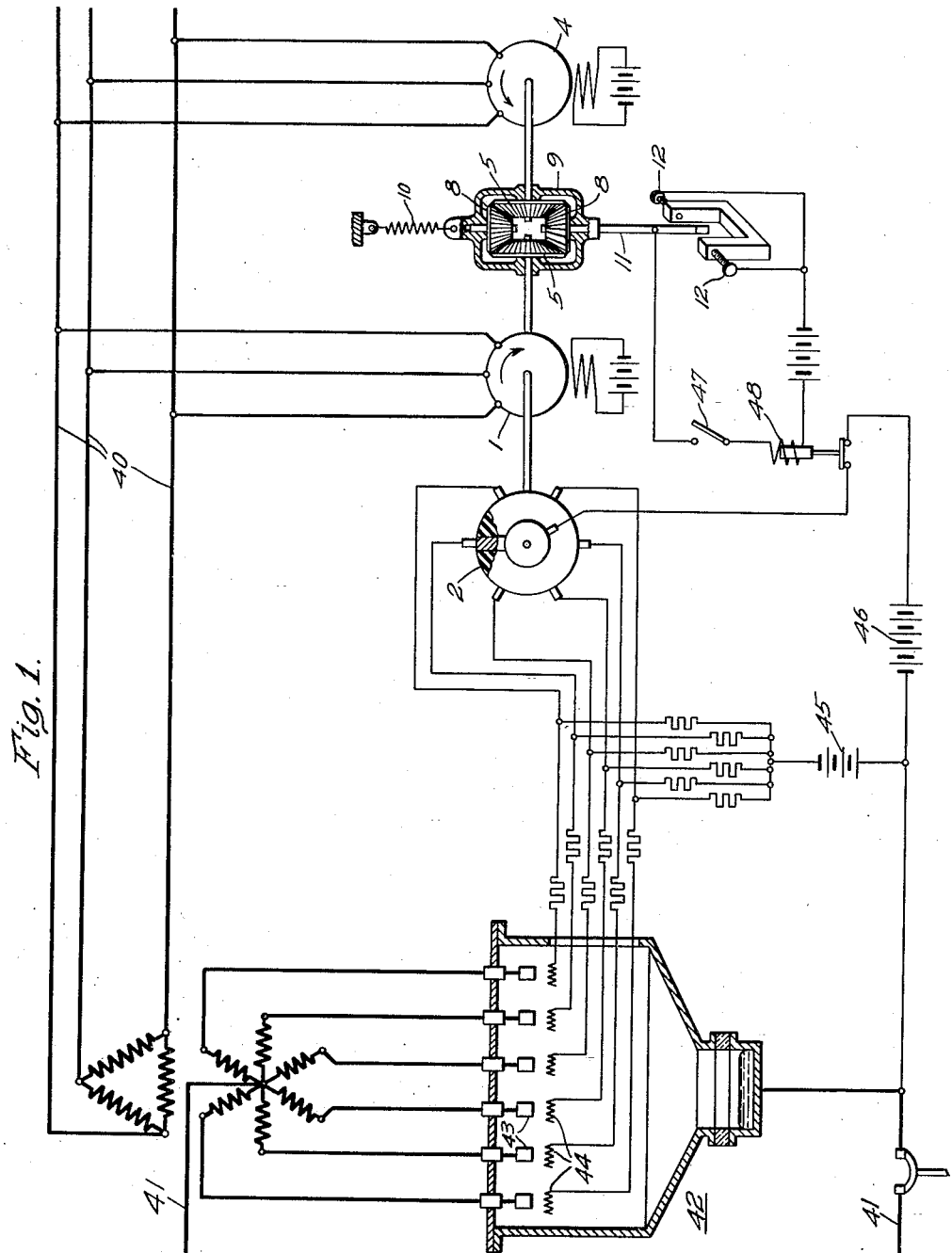
Figure 1 is a schematic illustration of a converter system embodying my invention.

The system according to my invention comprises an alternating current circuit 40 connected to a direct current circuit 41 by a converter 42 having a plurality of valves 43, each of the valves 43 having associated therewith a control electrode 44. Preferably the grids 44 are biased from a suitable source such as a battery 45 to maintain the grids in blocking condition. The blocking potential is periodically counterbalanced by applying potential from a suitable source such as battery 46 by a suitable contact device such as the rotary contactor 2 driven in synchronism with the frequency of the line 40 by a constant speed device such as the synchronous motor 1.

In the embodiment according to Fig. 1, the comparison of the rotational speed of the contact device 2 with the rotational speed of a comparison motor 4 takes place purely mechanically. The contact device 2 is arranged on a common shaft with the rotor of the synchronous motor 1 serving for the purpose of driving it. The rotational speed of the contact device 2 is to be compared with the rotational speed of the synchronous motor 4 which, for example, is energized from the same network 40 as the synchronous motor 1. For this purpose, the shaft of the contact apparatus 2 is coupled with the shaft of the synchronous motor 4 through a differential drive. The sun gears 5 of the differential drive are mounted on the shaft of the contact device and on the shaft of the synchronous motor 4, while the planetary gears 8 are arranged in a housing 9 supported in bearings rotatable about the axis of the sun gears 5. The direction of the rotation of the synchronous motor 4 must be opposite to the direction of rotation of the contact device 2. As long as the relative position of the sun gears 5 does not vary with reference to each other, accordingly as long as the rotational speed of the contact device 2 corresponds to the rotational speed of the synchronous motor 4, the differential drive does not exert a torque on the housing 9. The latter, therefore, remains in its original position. However, as soon as a deviation of the rotational speed of the contact apparatus 2 from the rotational speed of the synchronous motor 4 is manifested, the housing 9 is rotated in one direction or the other in dependence upon whether the rotational speed of the contact devices is too large or too small against the tension of the spring 10 which tends to maintain it in a central position, and the contact 11 attached to the housing 9 engages one of the two fixed contacts 12 conductively. The sensitivity of the arrangement, i. e., the angle with which the position of the contact device is to deviate from the synchronous position to produce operation of the supervisory device, depends on the distance of the two contacts 12 from each other. By selecting a small distance of these two contacts, the sensitivity of the arrangement may be raised to a high value.

Figure 2:
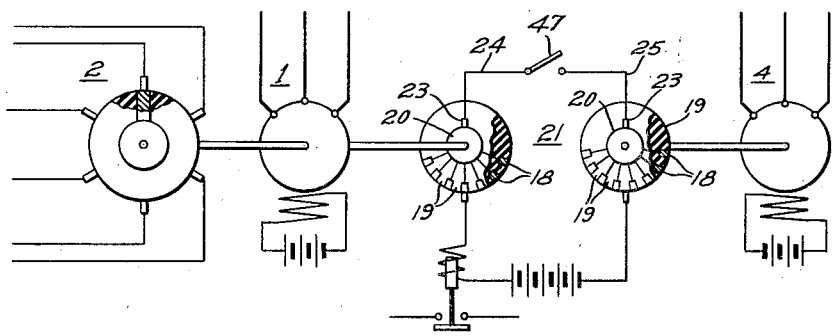
Fig. 2 is a fragmentary illustration of a modification showing an electro-mechanical supervisory system.

A further example, the operation of which also depends on the comparison of the rotational speed of the contact devices with the rotational speed of a motor 4, is illustrated in Fig. 2. Contact discs 21 are mounted on the shaft of the comparison motor 4, which is also to be constructed as a synchronous motor, as well as on the shaft of the contact device 2. On the periphery of these contact discs, contact members 18 with insulating elements 19 between them are mounted. The contact members of each of the discs are connected conductively with each other and lead to slip rings 20. The slip rings are engaged by brushes 23 which are conductively connected with each other so that the contact members of both contact discs are in conductive connection with each other independently of the rotational speed of both discs. The number of contacts 18 provided on the contact discs must be so selected that during disturbance free operation, when accordingly the contact device 2 rotates at synchronous speed, the number of contact elements per unit time that are contacted by the narrow brush 23, lying opposite to the laminated parts, is equal for both discs; it is accordingly not indispensibly necessary that the synchronous rotational speed of the comparison motor 4 shall correspond with the synchronous rotational speed of the contact apparatus 2. For disturbance free operation, there must only be a constant relationship between both rotational speeds. The brushes 23 may be so adjusted that during disturbance free operation, i. e., when the contact devices 2 have the proper synchronous position, one brush is directly located on one contact while the other brush lies on an insulating element. In this case, there is no conductive connection between the conductors 24 and 25 connected to the brushes 23. If the spacial position of the rotational speed of the contact devices 2 deviates by a predetermined value from the synchronous position, the relative positions of the contact discs 21 is so changed that both brushes 23 simultaneously engage contact members and produce a conductive connection between 24 and 25. Similarly, the position of brushes 23 may be so selected that for proper synchronous position of the contact devices 2, the connection between 24 and 25 is established and for deviation of the contact device position from the synchronous position, this circuit is interrupted. The sensitivity of this arrangement depends on the number of contact members 18 located on a single pole device of the drive motor. The greater this number, the more sensitive is the supervisory device.

Figure 3:
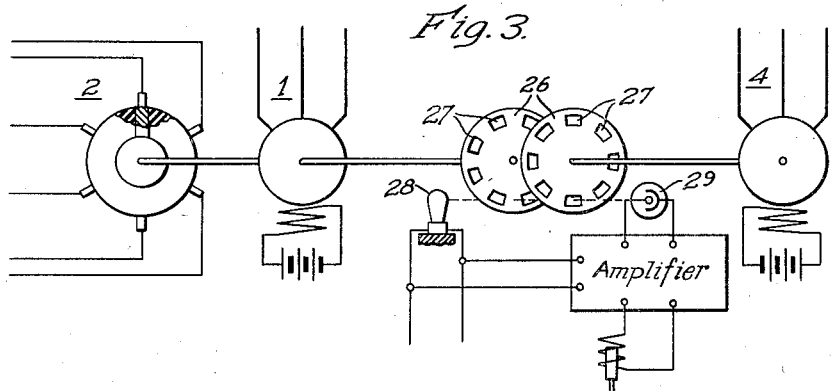
Fig. 3 is a similar view showing a photo-sensitive supervisory system.

Fig. 3 shows a supervisory device in which the rotational speed of the contact apparatus is compared with the rotational speed of the comparison motor 4 with the aid of a photo-electric device. On the shaft of the contact apparatus and on the shaft of the comparison motor 4, discs 26 are mounted, each of which is provided with openings 27 uniformly spaced along their periphery. The two discs 26 are interposed behind each other as rotating screens in the path of the rays between a light source 28 and a photocell 29. If, during proper synchronous position of the contact devices 2, both discs simultaneously transmit the rays, the A. C. potential which is produced by the resulting alternate illumination of the photocell is at its maximum. For deviation of the contact apparatus from the proper synchronous position, the alternate illumination of the photocell and with it the potential delivered thereby is decreased. Conversely, it is also possible to so adjust the discs that for the proper synchronous position, no light falls on the photocell 29 and illumination takes place only for deviation of the synchronous position.

Figure 4:
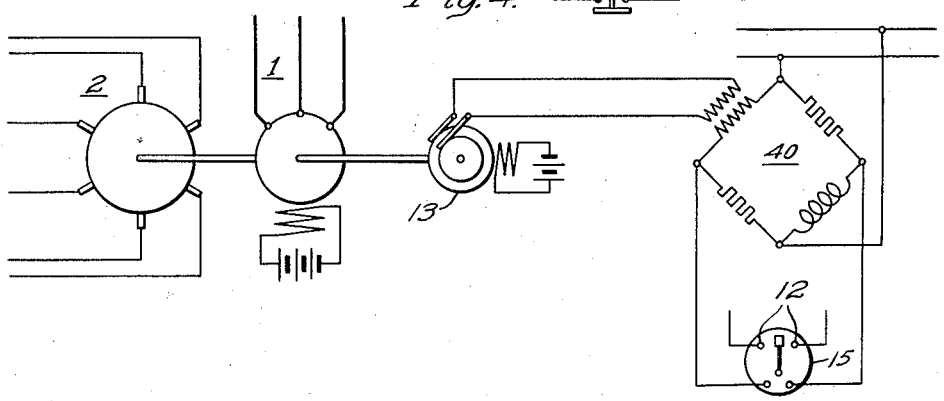
Fig. 4 is a further modification showing an electrical supervisory system.

A particularly advantageous modification of the inventive idea is illustrated in Fig. 4. In this arrangement a small A. C. generator 13 is coupled with the contact device 2 which again is driven from the synchronous motor 1; the frequency of the generator 13 is compared with the frequency of the A. C. network 40. For this purpose, a frequency dependent bridge network 14 is provided which is fed from the A. C. network 40 and in one branch of which the frequency delivered by the A. C. generator 13 is effective. As soon as the frequency of the potential of the generator 13 deviates from the frequency of the A. C. network 40, the bridge equilibrium is disturbed and a measuring instrument 15 provided with contacts is deflected.

The actuated contacts 11—12 which in the above described modifications of the invention are operated at the manifestation of a deviation of the contact apparatus rotational speed with reference to the synchronous rotational speed, or the disappearing potential which is manifested may be utilized to put the plant out of operation by any suitable means such as disconnecting the control potential 46 by the switch 48.

In utilizing a safety device according to the invention, the connection of the plant would under certain circumstances be impossible since the motors must be started from rest and a synchronous operation of both of the motors at increasing speed cannot in general be attained. It is, therefore, preferable to provide devices such as switch 47 which during increase in the speed of the motors maintain the safety devices out of operation and only connect them in when the contact apparatus has attained synchronous rotational speed at proper rotational position.

I claim as my invention:

1. A safety device for rectifiers controlled by contact apparatus running in synchronism, comprising a supervisory device which operates when the rotational speed of the contact apparatus deviates from synchronism, characterized by the fact that an alternating current generator is coupled to the contact apparatus and means is provided which compares its frequency with another bearing a constant relationship to its frequency during disturbance free operation.

2. A safety device for rectifiers controlled by contact apparatus running in synchronism, comprising a supervisory device which operates when the rotational speed of the contact apparatus deviates from synchronism, characterized by two contact discs of which one is driven by the contact apparatus while the other is driven by a comparison motor, each of the discs being provided on their circumference with uniformly spaced contacts which, among themselves and through slip rings and brushes with the contacts of the other contact discs, are connected so that between two brushes, one of which slides on one disc and one on the other, a conductive connection is established or broken only for deviation of the contact apparatus rotational speed from synchronism.

3. A safety device for rectifiers controlled by contact apparatus running in synchronism, comprising a supervisory device which operates when the rotational speed of the contact apparatus deviates from synchronism, characterized by two discs provided on their periphery with uniformly spaced openings, one of the discs being driven by the contact apparatus and the other by a comparison motor, and the discs being mounted in line with each other as screens in the path of the rays between a light source and a light responsive member, particularly a photocell, in such manner that only for deviation of the contact apparatus rotational speed from synchronism the radiant path is made completely free or is blocked.

4. A safety device for rectifiers controlled by contact apparatus running in synchronism, comprising a supervisory device which operates when the rotational speed of the contact apparatus deviates from synchronism, characterized by the fact that the frequency of an alternating current generator coupled to the contact apparatus is so connected with a comparison frequency in a frequency dependent bridge circuit that for variation of the relationship between the two frequencies, the bridge equilibrium is disturbed.

5. In a vapor electric conversion system having an alternating current and a direct current circuit interconnected by an arc discharge device, a protective system comprising control electrode for said device, means for normally impressing a blocking potential on said electrodes, means including a rotating contact device for periodically impressing control impulses on said electrodes, a motor operating in synchronism with said alternating current circuit for operating said contact device, a device operating in synchronism with said alternating current circuit, means for comparing the speed of said device and said motor and means operable by variation between said speeds for suppressing the control impulses.

6. In a vapor electric conversion system having an alternating current and a direct current circuit interconnected by an arc discharge device, a protective system comprising control electrode for said device, means for normally impressing a blocking potential on said electrodes, means including a rotating contact device for periodically impressing control impulses on said electrodes, a motor operating in synchronism with said alternating current circuit for operating said contact device, a device operating in synchronism with said alternating current circuit, means for comparing the speed of said device and said motor and a protective device operated by variation between said speeds.

7. A control system for a vapor-arc device connected to an alternating current circuit comprising a control electrode for said device, a source of control potential, means including a contact mechanism for periodically applying potential from said source to said electrode, a motor for operating said contact mechanism, means for comparing the rotational speed of said motor with its normal speed during disturbance free operation and means operated by said comparing means for blocking operation of said device.

8. A protective system for an arc-discharge device connected to an alternating current circuit, comprising a control electrode for said arc discharge device, a source of control potential for said electrode, means including a rotating contact device for periodically connecting said control potential to said electrode, a motor operating in synchronism with said alternating current circuit for actuating said contact device, a comparison motor operating in synchronism with said alternating current circuit, a disc driven by said driving motor, a second disc driven by said comparison motor, contact elements on the peripheral edges of said discs, and responsive to relative displacement of said contact elements for blocking said arc discharge device.

9. A protective system for an arc-discharge device connected to an alternating current circuit, comprising a control electrode for said arc discharge device, a source of control potential for said electrode, means including a rotating contact device for periodically connecting said control potential to said electrode, a motor operating in synchronism with said alternating current circuit for actuating said contact device, a comparison motor operating in synchronism with said alternating current circuit, a disc driven by said driving motor, a second disc driven by said comparison motor, there being openings in said discs, a light source cooperating with said openings, a photo-sensitive device responsive to the variation of light transmitted by said openings and means actuated by said photosensitive device for controlling operation of said arc-discharge device.

10. A protective system for a multi-valve vapor electric device comprising control electrodes associated with the valves of said device, circuit means for impressing control impulses on said electrodes, a contact apparatus running at synchronous speed for applying said impulses to said circuit means and supervisory means for discontinuing said impulses when said contact apparatus deviates from synchronous speed.

11. A protective system for a multi-valve vapor electric device comprising control electrodes associated with the valves of said device, circuit means for impressing control impulses on said electrodes, a contact apparatus running at synchronous speed for applying said impulses to said circuit means, a supervisory device operating at a speed comparable with the synchronous speed of said contact apparatus and said supervisory device and means operative when said contact apparatus deviates from synchronous speed to discontinue said impulses.

WALTER FOUQUET.